UNITED STATES PATENT OFFICE.

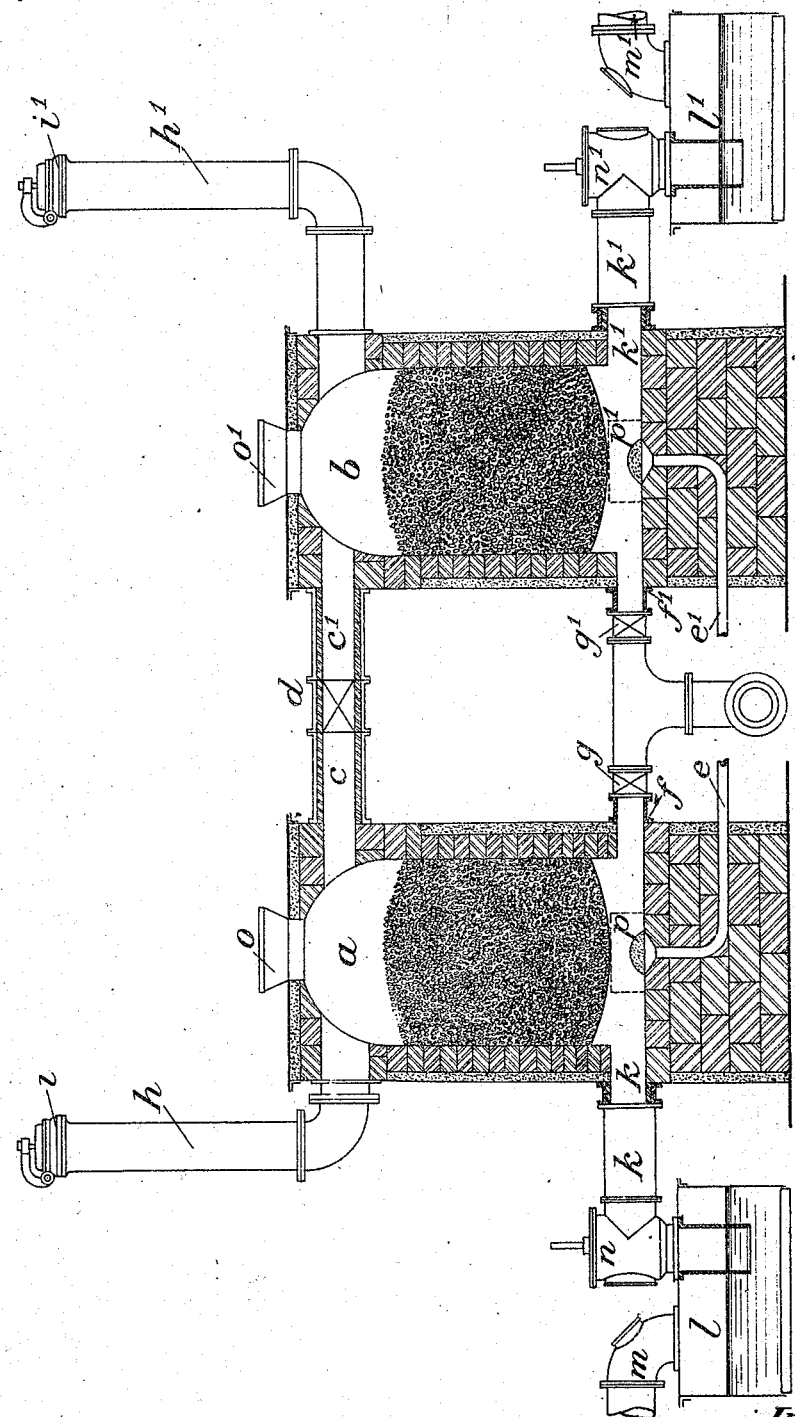

FRIEDRICH GODFRIED CARL RINCKER, OF WATERGRAAFSMEER, NETHERLA:

GASIFICATION OF SOLID FUEL.

1,388,145.  Specification of Letters Patent.  Patented Aug. 16, 1921.

Application filed October 4, 1919. Serial No. 328,462.

*To all whom it may concern:*

Be it known that I, FRIEDRICH GODFRIED CARL RINCKER, subject of the Queen of the Netherlands, residing at Watergraafsmeer, in the Kingdom of the Netherlands, have invented certain new and useful Improvements in or Relating to the Gasification of Solid Fuel, of which the following is a specification.

The object of the present invention is a process for the production of gas for lighting, heating or power and other purposes, from solid fuel such as coal, lignite, wood, wood-waste and the like by the use of generators or a pair of coöperating generators.

The essential feature of the present invention consists in the utilization of water-gas for the direct gasification of solid fuel such as coal, lignite, peat, wood, wood-waste and the like. The invention is further characterized in that in practice one generator is charged with coke, or steam is introduced into the coke charge therein for the production of water-gas and the water-gas so produced is led into the other generator for the purpose of gasifying the solid fuel therein. This operation is continued as long as gas continues to be evolved from the first generator and until the gasifiable fuel in the second generator is completely transformed into coke and all gas existing in the gasifying solid fuel and remaining by-products such as tar, ammonia and other gases have been completely or almost entirely expelled.

The process is then continued in the reverse direction. The first generator in which the generation of water-gas took place is charged with fresh quantities of the gasifiable materials, and also with coal, lignite, peat, wood, wood-waste and the like while steam is admitted to the second generator in which the material to be gasified was converted into coke in order to convert the fresh quantities of the gasifiable materials therein into gas and by-products such as tar, ammonia and other compounds.

The mass of coke which is alternately in each generator of the pair of generators is raised to the required temperature in any suitable and convenient manner as for example by a blast of air directed on the previously heated charge of coke.

In order that the invention may be clearly understood reference is made to the accompanying drawing which shows by way of example in vertical section a constructional form of apparatus in accordance with the present invention.

Referring to the drawing, $a$ and $b$ are two generators, which coöperate and are reversed in operation alternately in accordance with the aforesaid method of operation. $c$, $c'$ are two passages or pipes connecting the two generators with each other at the upper ends. $d$ is a suitable valve disposed between the passages $c$, $c'$ which valve prevents the escape of the gases in one generator during the hot blast to the other generator, the said valve being open when the evolved water-gas flows to the other generator. $e$, $e'$ are conduits at the lower part of the generators for the purpose of admitting steam for the generation of water-gas. $f$, $f'$ are pipes for the supply of air to the generators, which are provided with cut-off valves $g$, $g'$. $h$, $h'$ are flues for the escape of the products of combustion of waste gases from the upper part of the generators. The flues $h$, $h'$ are provided with closing covers $i$, $i'$. These covers are used to close the flues $h$, $h'$ when the generator in which the water-gas is being generated attains the required temperature. $k$, $k'$ are pipes which lead the evolved gas mixture to the receiver $l$ or $l'$ according to the direction in which the plant is being operated. The gas mixture escapes from the receivers $l$, $l'$ to the purifying plant and from thence is led to the gas holders. $n$, $n'$ are valves inserted in the pipes $k$, $k'$ which valves serve to lead the evolved gas-mixture to the receivers $l$, $l'$ or to confine the said gas in accordance with the direction of working. $o$, $o'$ are openings through which fresh quantities of fuel or gasifiable material are alternately fed to the generators. $p$, $p'$ are doors through which the waste material can be removed.

The method of operation is as follows:

Assume the operation is commenced with the generator $a$, which is charged with coke, while at the same time the other generator $b$ is filled with any suitable solid fuel, from which the desired gas can be generated. If it be desired to obtain coal gas and its by-products, the generator $b$ is charged with coal. If the gas from brown coal or lignite be desired, the generator is charged with brown coal or lignite. The coke-charged generator is thereafter heated in the usual manner and raised to the desired temperature and air is then admitted to the generator $a$ by the pipe $f$.

During the whole period of operation of the air blast, the valve $d$ remains closed in order to prevent the flow of waste gas to the generator $b$. On the other hand the valve $d$ is opened, if working is effected in the opposite or reverse direction, that is, when in the succeeding period of working the water-gas is produced in the generator $b$ and is led to the generator $a$. The evolved waste gas escapes by the flue $h$, either to the atmosphere or it can be used in any known manner for heating or other purposes. As soon as the coke in the generator $a$ acquires the desired temperature, steam is admitted thereto by the pipe $e$ and the gas-period for the production of water-gas begins.

The air admission pipe $f$ to the generator $a$ is then closed. Simultaneously therewith the cover $i$ of the flue $h$ is closed in order to prevent the escape of the water-gas generated and the valve $d$ in the passage or conduit $c$ is opened, in order to allow the produced water-gas to flow to the generator $b$. Simultaneously therewith the cock $n'$ is opened so as to allow the mixture of gases to escape through the outlet to the receiver $l'$.

The water-gas produced in the generator $a$ now flows through the valve $d$ to the generator $b$ and this gas evolution period continues as long as a satisfactory evolution of water-gas takes place in the generator $a$. The water-gas produced in the generator $a$ possesses an average temperature of about 1000° centigrade. By bringing this volume of highly heated water-gas into contact with the gasifiable mass (coal, brown coal or lignite, peat, wood, wood-waste and the like) contained in the cold or non-heated condition in the generator $b$ gases are produced therein from the known materials. These gases are led from the generator $b$ by the pipe $k'$ through the valve $n'$ to the receiver $l'$ and thence by the pipe $m'$ to the purifying plant, and then to the gas holders.

The gasifiable material in the generator $b$ is simultaneously converted into coke or similar substance and this quantity of coke now serves for the production of water-gas when working the plant in the opposite or reverse direction.

When the charge of coke in the generator $a$ has decreased to such an extent that the yield of water-gas therein is considered insufficient, the direction of working is then reversed. For this purpose the cock or valve $n'$ is closed to the flue $h'$ and the cover $i'$ of the flue $h$ is opened. The cock or valve $g'$ of the air inlet conduit $f'$ is opened and the valve $d$ between the passage $c$, $c'$ is closed.

The coke charge in the generator $b$ resulting from the preceding gaseous movement, which charge shows a temperature of about 800° C., is no longer heated to the required temperature by the introduction of steam for the production of water-gas. This is effected by the admission of air through the inlet pipe $f'$ and through the cock or valve $g'$ built into the air pipe. After the coke in the generator $b$ is raised to the required temperature, and steam is supplied to the generator $b$ through the pipe $e'$ the flow of gas begins. As soon as the temperature required for the flow of gas is reached, the cover $i'$ of the flue $h'$ and the cock $g'$ of the air blast pipe $f'$ are closed. The valve $d$ and the valve $n$ coöperating with the generator $d$ are opened. The water-gas evolved in the generator $b$ is now led by the pipe $c'$, valve $d$, pipe $c$ to the generator $a$ which is previously charged with gasifiable material also with coal, lignite, peat, wood, wood-waste and there thus ensues on the one hand the conversion of this material into a kind of coke which in the succeeding working period is used again for the production of water-gas, and on the other hand a mixture of water-gas and coal-gas or the like is produced which is led to the receiver $l$ through the pipe $k$ and the valve $n$, the gas in the receiver $l$ passing to the purifying plant by the pipe $m$ and then to the gas holder or holders.

This method of operation may obviously be repeated as often as desired.

The gas mixture evolved in the generator consists obviously of a mixture on the one hand of water-gas and on the other hand of such other gases as may be distilled from the gasifiable material, and in the case of the gasification of coal, of coal-gas and its by-products. In the case of the gasification of brown coal or lignite the mixture would consist of water-gas and the gas evolved from the lignite together with its by-products.

The amount of tar, ammonia and other by-products remaining in the receivers $l$, $l'$ may be utilized in any known manner.

The technical and economic advance effected by the present invention may be stated as follows:

First, that gasification is effected by direct heating of the evolved water-gas and not by indirect heating.

Second, that the considerable loss of heat consequent on the removal of the incandescent coke from the retorts and cooling with water as heretofore practised is thus avoided.

The further advantage of this method consists in the fact that when the operations are reversed, the coke is already at a high temperature, and there is no need of removing it from the device, to then replace it, which caused a crumbling and loss of the coal.

Having described my invention, what I claim is:

1. A method for producing gas from solid fuel such as coal or the like which consists in passing water gas through said fuel, so as to leave a residue of coke while producing gases which are led off, and then after the said gases have been evolved from the said material, passing steam through the said residue of coke before it has substantially cooled, the coke being at a sufficiently high temperature to cause the production of water gas and then passing the water gas so produced without any substantial lowering of the temperature thereof, through another mass of fuel for the purpose of producing gases from said other mass, the said fuel being always at a lower temperature than the water gas acting thereon, and the mixture of water gas and gases produced from said fuel being led directly to a receiver.

2. A method of producing gas from solid fuel such as coal and the like, which consists in passing steam through a body of hot coke in an inclosed region so as to produce water gas at high temperature, passing the said water gas without any substantial lowering of its temperature to a second region and allowing it to act in the said second region upon a body of fuel such as coal and the like, which is at a lower temperature than said water gas, until the coke in the first region has been consumed and the coal in the second region has been substantially transformed into coke, then heating the coke in the second region before any substantial cooling thereof until the introduction of steam therein will produce water gas at a high temperature and leading the said water gas without any substantial loss of heat, to a mass of coal or the like located in the said first region.

3. A method of producing gas from solid fuel such as coal and the like, which consists in passing steam through a body of hot coke in an inclosed region so as to produce water gas at high temperature, passing the said water gas without any substantial lowering of its temperature to a second region and allowing it to act in the said second region upon a body of fuel such as coal and the like, which is at a lower temperature than said water gas, until the coke in the first region has been consumed and the coal in the second region has been substantially transformed into coke, then heating the coke in the second region before any substantial cooling thereof until the introduction of steam therein will produce water gas at a high temperature and leading the said water gas without any substantial loss of heat, to a mass of coal or the like located in the said first region, the mixture of water gas and gas produced from the said fuel being always lead directly to a receiver without any substantial loss of heat.

4. A method of producing gas from solid fuel such as coal and the like, which consists in passing steam through a body of hot coke in an inclosed region so as to produce water gas, the temperature of said hot coke and steam being such that the said water gas has a temperature of at least $1000°$ C. passing the said water gas without any substantial lowering of its temperature to a second region and allowing it to act in the said second region upon a body of fuel such as coal and the like which is at a temperature less than $1000°$ C. until the coal in the said second region has been substantially transformed into coke at a temperature of not less than $800°$ C., then heating the coke in the second region until the introduction of steam therein will produce water gas at a temperature of not less than $1000°$ C. and leading the said water gas without any substantial loss of heat to a mass of coal or the like located in the first region.

In testimony whereof I have affixed my signature.

FRIEDRICH GODFRIED CARL RINCKER.